3,089,783
CORROSION RESISTANT COATING AND METHOD OF APPLYING THE SAME
William A. Carlson and John R. Little, Rochester, N.Y., assignors to Pfaudler Permutit, Inc., Rochester, N.Y., a corporation of New York
No Drawing. Filed Jan. 6, 1960, Ser. No. 719
6 Claims. (Cl. 117—66)

This invention relates to a method for coating metals with plastics and more particularly to a method for coating metals with insoluble corrosion resistant plastics, one object being a provision of a satisfactory coating of this nature.

The art of protecting metallic surfaces from corrosion by means of corrosion resistant synthetic plastic materials is well known. Many coating compositions consisting of various paints, varnishes and enamels have been developed for this purpose. However, all of the coatings heretofore known have had numerous shortcomings; many of them are soluble in petroleum fractions or other organic solvents, many cannot withstand the action of corrosive chemicals such as acids and bases, others fail rapidly on exposure to elevated temperatures, others cannot withstand long immersion in aqueous solutions, and so forth. For this reason, no satisfactory corrosion resistant coating has yet been formulated which has had wide applicability for lining the interior surfaces of chemical and process equipment apparatus.

Recently a number of highly resistant synthetic plastics have come on the market. These plastics include the fluorocarbons, chlorinated polyethers (such as the resin sold under the tradename "Penton"), and others which have a high resistance to all, or practically all of the chemicals used in the process industries. However, since these resistant materials are practically insoluble in all known chemical solvents, it has heretofore been found impossible to dissolve the same to produce a coating material for application to the interior surfaces of the process apparatus.

Numerous expedients have been devised in the attempt to develop a method for producing coherent, non-porous coatings of such resins or metal. For example, one technique for producing such coatings is the immersion of a heated metallic part to be coated in a bed composed of fine particles of the coating resin suspended or fluidized in a moving stream of air to cause the fluidized particles in contact with the metal to adhere thereto to form a coating. Generally, a second heating step is required to coalesce the particles to produce a smooth, non-porous coating. This method, although it has produced coatings of fair degree of corrosion resistance has certain shortcomings. In the first place, it is difficult to coat apparatus of any great size since the entire part to be coated must be immersed in the fluidized bed. Further, in order to produce a coating at all, the metallic article to be coated must be heated to temperature well above the fusion point of the resin. This excessive heating of the resin during the deposition partially degrades the same, producing a coating having less desirable physical properties and poorer adhesion than would be possible if the resin were deposited in its original, undegraded state.

This invention comprises a method of depositing uniform, coherent, high integrity layers of "Penton" on the surface of a metallic article but by means of forming a suspension of fine particles of the resin in an aqueous medium, applying the suspension to the article to be coated, drying the suspension in place, and then fusing the resin at controlled temperature thereby producing a coherent, non-porous coating on the surface of the metal.

In order to produce a satisfactory coating of material based on the insoluble, highly corrosion resistant plastic materials such as the material marketed under the trade name "Penton," it is first necessary to produce a workable, sprayable formulation therefrom. However, the very properties that make the coatings produced from these materials desirable; that is, their insolubility, toughness, and chemical inertness, make the formulation of such sprayable coating materials exceedingly difficult. In the first place, their relatively complete insolubility in known reagents makes it impossible to produce a solution of these materials of sufficient concentration to form a coating material in the known manner. In the second place, their chemical inertness makes it impossible to reduce them to a soluble form and later reconstitute them in situ as is the case with air drying or polymerizing coatings. Their toughness makes it difficult to reduce them to a sufficiently fine particle size to be easily suspended in a vehicle and therefore renders the production of a suspension type of coating difficult. However, since it has been heretofore found impossible to make up a solution of these materials, the production of a suspended type of coating appears at the present time, to be the only practical solution to this problem. For this reason, it is an object of this invention to produce a stable, sprayable invention containing a requisite concentration of these corrosion resistant plastic materials to form a practical coating material.

After the actual application of a coating by spraying of such suspension, it is necessary that the coating material be sufficiently thixotropic to remain in place forming a cohesive liquid film till the suspension can be dried. After the drying, the dried suspension must have sufficient mechanical strength and adherence to maintain its integrity during further handling until the coating has been finally fused into place. For this reason, it is necessary to add materials to the formulation to impart sufficient thixotropic properties to the film when wet, and a binder to provide sufficient cohesive strength when dry prior to fusing to maintain its integrity during the further handling of the coated article prior to and during the firing of the coating. The provision of a suspension having such properties is another object of this invention.

The surface active type of agents which are commonly used to impart thixotropic properties to suspensions are generally not corrosion resistant and lack the other desirable properties inherent in the corrosion resistant plastics themselves. Therefore, the addition of any substantial amount of these agents tends to degrade the quality of the coating and impair its desirable properties. For this reason it is necessary to utilize an agent which does not have these undesirable side effects, or one that will disappear from the coating upon further treatment, or to use such agents in such small quantities that they have no appreciable effect upon the coating.

In addition to the above properties, any coating suspension material suitable for commercial use for forming corrosion resistant plastic coatings of high integrity must be so formulated that when the dry film is fired or fused into place, the particles thereof will coalesce into an adherent, coherent, continuous film of high integrity without running or sagging during the heating process. The provision of such a suspension material is another object of this invention.

Another object of this invention is the provision of a method for coating metal with insoluble resins of the above description which avoids the degradation of the resins which occurs when the resin is heated to a considerable degree above its melting point.

Further objects of this invention include the provision of a method of coating metallic objects which is not limited by the size or intricacy of shape of the object.

Other objects and advantages of this invention will be particularly set forth in the claims and will be apparent from the following description.

In order to produce a suspension of corrosion resistant plastic particles it is necessary that the size of the particles be sufficiently small so that they will remain dispersed in the vehicle. If the particles can be reduced to the size within the colloidal range, there is no great difficulty in attaining such a dispersion; however, if the particles are somewhat larger, such dispersions are more difficult to produce. Since it is difficult and expensive to reduce a tough, resilient material such as "Penton" to particles in the colloidal size range, it is necessary to provide means for dispersing somewhat larger particles. It has been found that with particles having a size of under 200 mesh, that stable suspensions can be economically produced by using the following techniques.

A suspension of a quantity of approximately 100 parts of "Penton" reduced to pass through a 200 mesh screen is added to approximately 100 to 130 parts of water. However, it has been found that since "Penton" is considerably heavier than water (its specific gravity is approximately 1.4), such suspensions are not indefinitely stable. The heavier "Penton" tends to settle out into a relatively dense layer at the bottom of the container upon standing for a period ranging from a few hours to several days, depending upon the fineness of the particles and the concentration of the suspending agent. In order to prevent this condition, it has been found desirable to add a flocculating agent, preferably cationic, such as a long chain amine (one example of which is sold under the trade name "Armeen 8") in a quantity ranging from ½ part to 1/10 part. It is added to act as a flocculating agent, and the resulting mass is agitated to form a suspension. This flocculating agent causes the suspended particles to agglomerate into clumps which are loosely held together. While at first this may appear to aggravate the settling problem it has actually been found, in practice, that this produces a more stable, sprayable suspension. When such a flocculated suspension settles, it will settle into a loose mass of agglomerated particles rather than a hard, dense mass of finer particles. This soft sediment comprising a layer of loosely agglomerated particles may easily be brought into suspension again simply by stirring, and therefore this suspension may be stored for a longer period of time and rendered suitable for immediate use by simple agitation. On the other hand, if no agglomerating agent is used, the particles settle out in a hard, dense sediment on the bottom of the container after extended storage. For this reason, it is generally preferred to use a flocculating agent which will cause the suspended particles to agglomerate into loose clumps, which upon settling, form a softer sediment than the sediment produced by unagglomerated suspended particles. A settled suspension prepared as described above can be restored to the original sprayable condition by agitation, provided the settling period has not been excessive. However, as is well known, surface active agents gradually lose their effectiveness during long periods of storage. The accepted explanation for this phenomenon is that the active portions of the molecules of these agents have great affinity for each other, and that during the passage of time, these molecules tend to gather into clumps or "micelles," thereby losing their effectiveness. When this occurs, the settled suspension cannot be restored by simple agitation. It has been found, however that this condition can be corrected, and the flocculated suspension restored to sprayable condition by the replenishment of the surface active agent.

The suspensions formed as described above can be maintained sufficiently homogeneous for spraying purposes by simple agitation. When such agitated suspension is sprayed, it forms a continuous cohesive film upon the surface which has sufficient thixotropic properties in order to remain in place even on a vertical or lower surface of the object being coated. This thixotropic property is aided by the flocculating agent which produces a cohesive film having considerable viscosity when applied in thin films on the surface of an object. This thixotropic film strength is maintained until the film has dried preparatory to firing.

After the sprayed film has dried, it must retain sufficient mechanical strength in order to maintain the integrity of the coating during the subsequent handling preparatory to firing. It has been found that a binder is necessary in the formulation in order to assure this dry film strength prior to the firing of the coating. Further, this binder must have the following properties, it must either be used in a very small quantity, or it must disappear during firing, or it must have sufficient corrosion resistant properties in itself not to degrade the corrosion resistant properties of the coating.

Many binding agents have been tried for this purpose, with more or less successful results, but it has been found that pectin, carboxymethyl starch, and amylopectin starch are most satisfactory for this purpose. The addition of one of these agents to the original suspension in quantities of between 0.1 and 5 parts (with 100 parts of plastic and 100 to 130 parts of water as described above), imparts sufficient film strength both during the wet stages of the film when it is drying, and acts as a binder to impart mechanical strength to the dried film preparatory to firing. It is not known whether these materials break down and disappear during the fusion of the coating either by volatilization or otherwise, or whether they simply have no deleterious effects on the coatings since it has been impossible to detect their presence or absence in the coating; however, it has been found that the addition of these agents in the quantities specified has no appreciable effect on the physical or chemical corrosion resistant properties of the finished coating.

The concentration of approximately 100 parts of powdered "Penton" to approximately 100 to 130 parts of water produces a material which can be built up to sufficient film strength to maintain itself in a thickness such that when the water is removed by evaporation, that the "Penton" material remaining behind will form a coating of approximately 5 to 20 mils in thickness. More dilute suspensions can also be used if desired; however the more dilute the suspension the thinner the finished coating after the vehicle has been removed. On the other hand, more concentrated suspensions will produce thicker coatings when dried, but it has been found that the concentration described above is close to the practical upper limit for producing a free flowing, sprayable suspension. If additional thickness of coating is needed this can be obtained by applying successive coatings of the plastic material in order to build up the desired film thickness.

After the suspension has been applied as described above, and thoroughly dried, the finished coating can be produced by heating the part to be coated to a temperature just above the fusing temperature of the "Penton." "Penton" fuses at approximately 375 degrees F., but is not readily flowable at this temperature, and the particles do not coalesce sufficiently to form the continuous coating of high integrity desired. For this reason, it has been found best to heat the coated article to a temperature of approximately 470 degrees F. for a relatively short time (preferably between 5 and 60 minutes) and then to cool the object as rapidly as possible in order to prevent degradation of the corrosion desistant properties of the plastic. Heating to a temperature in excess of 470 degrees F. adversely affects the chemical resistance of the coating, and the metal-"Penton" bond and maintenance of the coating at this temperature for any extended period of time has the same result. Therefore, it is critical that the coating be fused at a temperature not exceeding 470 degrees F. in as short time as possible, and that the coating then be cooled as rapidly as possible in order to prevent excessive thermal degradation of the "Penton,"

which adversely affects the corrosion resistant properties of the coating.

If greater film thickness is desired, successive coats can be applied by spraying on another layer of suspension, drying the same, and heating to a temperature sufficient to fuse the coating. It has been found that the second and successive coatings can be adequately fused at lower temperatures, ranging downward from 470 degrees for the first coating to about 430 degrees for the second and other successive coatings. However, since "Penton" fuses at 375 degrees, the temperature of fusion must be higher than this figure in order to attain a smooth coating.

After the coating has been applied as described above, a dense hard corrosion resistant coating of high integrity is formed. It has been found that the addition of the "Armeen 8" in amounts of less than ½ of one percent for flocculating the plastic in the aqueous vehicle has no appreciable effect on the integrity of the coating since the amount therein is so minute. Further, the use of binding agent in amounts approximately of one percent (and in any case, under 5 percent) also has no deleterious effect on the final corrosion resistance of the coating although the mechanism of this is not understood.

Other suspending and flocculating agents may also be used not only to attain suspensions of specific properties but to impart different properties to the coating. Such suspending agents as colloidal silica, colloidal graphite, titanium dioxide, etc. have also been used under special conditions. However, the last three mentioned have the disadvantage of tending to render the final coating brittle although they have little effect on the corrosion resistance thereof.

From the above it may be seen that the invention attains its desired objects. By means of the methods stated above, a stable, sprayable corrosion resistant suspension may be produced, having a considerable shelf life, and which may be restored to and maintained in sprayable condition by simple agitation or, in exceptional cases, by the addition of additional flocculating agent. The wet film or thixotropic strength of this material is sufficient to sustain a film which, after firing, will produce a coating of up to 20 mils, and it has sufficient dry strength in this thickness to maintain integrity of the coating during the handling preparatory to firing. During the firing step, the individual particles of "Penton" coalesce to form a relatively smooth continuous coating having high integrity, and excellent corrosion resistant properties. If the firing step is carefully controlled as herein described, the metal-"Penton" bond and the corrosion resistance of the "Penton" particles is not degraded to any measurable extent, and thus the full advantage of the corrosion resistant and other properties of this material are preserved in the finished coating.

While we have shown and described the preferred form of mechanism of our invention it will be apparent that various modifications and changes may be made therein, particularly in the form and relation of parts, without departing from the spirit of our invention as set forth in the appended claims.

We claim:

1. A sprayable coating material comprising, in combination, a water vehicle, particulate chlorinated polyether reduced to approximately 200 mesh, a flocculating material sufficient to flocculate such suspension and a binding material.

2. A sprayable coating material comprising, in combination, 100–130 parts of water, 90–110 parts of chlorinated polyether reduced to pass a 200 mesh screen, a flocculating agent, and a binding agent.

3. A sprayable coating material as claimed in claim 2 wherein said flocculating agent is a long chain amine.

4. A coating material as claimed in claim 2 wherein said binding agent is chosen from the class comprising pectin and carboxymethyl starch, and amylopectin starch.

5. The process of making a sprayable coating material from chlorinated polyether comprising the steps of reducing said chlorinated polyether to pass a 200 mesh screen, adding said chlorinated polyether to water, flocculating the resulting suspension with a long chain amine, and adding a binding agent thereto.

6. The process of coating a surface with a chlorinated polyether comprising reducing the method steps of reducing said polyether to pass a 200 mesh screen, adding said chlorinated polyether to water while stirring to produce a suspension, flocculating said suspension by adding a flocculating agent, adding a binding agent, spraying said suspension on the surface to be coated, drying said sprayed surface, and heating said coated surface to a temperature just in excess of the fusion temperature of said chlorinated polyether.

References Cited in the file of this patent

UNITED STATES PATENTS

| | | |
|---|---|---|
| 2,340,358 | Young | Feb. 1, 1944 |
| 2,478,229 | Berry | Aug. 9, 1949 |
| 2,540,962 | Puppolo | Feb. 6, 1951 |
| 2,710,266 | Hochberg | June 7, 1955 |
| 2,878,196 | Buffington | Mar. 17, 1959 |

FOREIGN PATENTS

| | | |
|---|---|---|
| 558,581 | Canada | June 10, 1958 |

OTHER REFERENCES

Taylor, "Chlorinated Polyether," Modern Plastics Encyclopedia, pp. 171, 172. Copy in Div. 25.

Rudner, "Fluorocarbons," Reinhold Plastics Application Series, Reinhold Pub. Corp., p. 143. Copy in Div. 25.